United States Patent
Pacheco

(10) Patent No.: US 9,885,214 B2
(45) Date of Patent: Feb. 6, 2018

(54) THREADED TOOL JOINT CONNECTION

(71) Applicant: PTECH Drilling Tubulars, LLC., Conroe, TX (US)

(72) Inventor: Cain Pacheco, Houston, TX (US)

(73) Assignee: PTECH Drilling Tubulars, LLC, Conroe, TX (US)

( * ) Notice: Subject to any disclaimer, the term of this patent is extended or adjusted under 35 U.S.C. 154(b) by 877 days.

(21) Appl. No.: 14/331,030

(22) Filed: Jul. 14, 2014

(65) Prior Publication Data
US 2014/0333065 A1 Nov. 13, 2014

Related U.S. Application Data

(63) Continuation-in-part of application No. 12/502,722, filed on Jul. 14, 2009.

(51) Int. Cl.
*E21B 17/042* (2006.01)
*F16L 15/06* (2006.01)
*F16L 15/00* (2006.01)

(52) U.S. Cl.
CPC .......... *E21B 17/042* (2013.01); *F16L 15/001* (2013.01); *F16L 15/06* (2013.01)

(58) Field of Classification Search
CPC ........ E21B 17/042; F16L 15/001; F16L 15/06
USPC ...................... 285/333, 334, 390, 383, 332.4
See application file for complete search history.

(56) References Cited

U.S. PATENT DOCUMENTS

| | | | |
|---|---|---|---|
| 5,549,336 A * | 8/1996 | Hori | E21B 17/042 285/333 |
| 5,810,401 A * | 9/1998 | Mosing | E21B 17/0426 285/333 |
| 5,908,212 A | 6/1999 | Smith et al. | |
| 6,030,004 A | 2/2000 | Schock et al. | |
| 6,305,723 B1 * | 10/2001 | Schutz | E21B 17/042 285/333 |
| 6,467,818 B1 | 10/2002 | Snapp et al. | |
| 6,485,220 B2 * | 11/2002 | Hecht | B23B 31/11 403/343 |

(Continued)

FOREIGN PATENT DOCUMENTS

GB 2408472 6/2005

OTHER PUBLICATIONS

Mac Thomas and Jackie E. Smith, "Box OD Stability of Double Shoulder Tool Joints at Catastrophic Failure", IADC/SPE 35035, paper presented Mar. 12, 1996, pp. 33-40, IADC/SPE Drilling Conference, New Orleans, LA.

*Primary Examiner* — James M Hewitt, II
(74) *Attorney, Agent, or Firm* — Tim Headley

(57) ABSTRACT

In a double-shoulder threaded tool joint connection, the pin external threads and the box internal threads have a thread taper between 0.75 inch per foot and 1.0 inch per foot. The pin external threads and the box internal threads have equal stab flank and load flank angles, and are in a range from thirty-three to thirty-nine degrees. Both the pin external threads and the box internal threads have roots formed in a shape of a portion of a circle tangent to both thread flanks with a minimum radius of 0.063 inch. The pin external threads and the box internal threads are in the range of two to three per inch. The box counterbore has a length of 0.750 or less. The pin nose has a length in a range of 30% to 90% of the length of the box counterbore.

14 Claims, 4 Drawing Sheets

(56) References Cited

U.S. PATENT DOCUMENTS

| | | | |
|---|---|---|---|
| 6,581,980 B1 * | 6/2003 | DeLange | E21B 17/042 |
| | | | 285/333 |
| 6,848,724 B2 | 2/2005 | Kessler | |
| 7,210,710 B2 * | 5/2007 | Williamson | E21B 17/042 |
| | | | 285/333 |
| 7,416,374 B2 | 8/2008 | Breihan et al. | |
| 7,455,329 B2 * | 11/2008 | Muradov | E21B 17/042 |
| | | | 285/333 |
| 2005/0189147 A1 | 9/2005 | Williamson et al. | |
| 2006/0214421 A1 | 9/2006 | Muradov | |

* cited by examiner

THREADED TOOL JOINT CONNECTION

CROSS-REFERENCES TO RELATED APPLICATIONS

This is a continuation-in-part of application Ser. No. 12/502,722, filed Jul. 14, 2009.

STATEMENT REGARDING FEDERALLY SPONSORED RESEARCH OR DEVELOPMENT

None.

REFERENCE TO A "SEQUENCE LISTING", A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

None.

BACKGROUND OF THE INVENTION (1) Field of the Invention

The invention relates in general to drill stem threaded connections used in oil field and trenchless horizontal drilling operations. In particular, the present invention relates to threaded connections on drill pipe tool joints, heavy weight drill pipe, drill collars, and or other drill stem elements. Still more particularly, this invention relates to double shouldered connections capable of withstanding increased torque, bending and tensile loading, while maintaining a tool joint with a large ID and a small. OD.

(2) Description of the Related Art

U.S. Pat. No. 5,908,212 ("the Smith patent") discloses a double-shoulder threaded connection with a taper less than one inch per foot and a box counterbore with length of at least 1.5 inches (FIG. 1, Column 1, lines 34-50). It achieves high torque resistance with a minimum ratio of cross-sectional areas. The Smith patent does not disclose (a) means for resistance to bending fatigue by the connection threads, (b) means for reducing stress concentrations in the connection roots, or (c) a means to avoid swelling or buckling of the box counterbore or pin nose.

U.S. Pat. No. 6,030,004 ("the Schock patent") discloses a double-shoulder, torque-resistant threaded connection. The tool joint is provided with thread shaving a seventy-five degree included angle between the thread flanks, and with generally elliptical root surfaces (FIG. 1 Column 4, lines 1-23, and Column 5, lines 15-49, FIGS. 7 and 9). The Schock patent does not disclose (a) means for achieving high torque forces with a shallow thread taper; (b) means for enhanced fatigue resistance, using a large root surface that is a product of only a single root radius; and (c) means to achieve a "slim-hole" design, that is, having a small OD and a large ID.

U.S. Pat. No. 7,210,710 ("the Williamson patent") discloses a double-shoulder drill stem connection. In discussing its FIG. 2, the Williamson patent teaches a thread taper of the box and pin threads of preferably 1 and ⅛ inches per foot. With such a taper, the turns-to-make-up are decreased, because the stabbing depth is increased. However, such a taper decreases the amount of cross-sectional area that is at the secondary (internal) shoulder, which reduces torque capabilities. Also, with such a taper the ID of the connection cannot be as large as shallower taper connections, because there will be a conflict with maintaining enough steel to have an internal shoulder. Finally, such a taper does not allow a "slim-hole" design, that is, a design having a small OD and a large ID.

The Williamson patent teaches the use of dissimilar load flanks. Because of that dissimilarity, the Williamson device has to use two or more radii to bridge the two load flanks. Thus, as claimed in its claim 7, the roots of the internal and external threads are formed in a shape of a portion of an ellipse. The Williamson patent also asserts, in discussing its FIG. 2 (column 8, lines 17-21) that "the length of the pin nose L. sub. PN should be about one to one and one-half times as long as the counterbore length L. sub. BC." Further, the counterbore length is about 1 inch (longer than conventional connections). The Williamson patent does not disclose (a) means for achieving high torque forces with a shallow thread taper, (b) means for enhanced fatigue resistance using a large root surface that is a product of only a single root radius, and (c) a means to avoid swelling or buckling of the box counterbore or pin nose.

U.S. Pat. No. 5,810,401 discloses dual mating shoulders and nose faces on the pin and box members. U.S. Pat. No. 6,467,818 ("the Snapp patent"), U.S. Pat. No. 6,848,724 ("the Kessler patent"), and U.S. Pat. No. 7,416,374 ("the Breihan patent") disclose thread forms with one or more root radii larger than that of conventional API by offsetting the center of one or more radii from the centerline of the thread flanks. In each of these designs, offsetting the root radii undercuts one of the thread flanks, weakening the threads' shear capacity, and are limited to radii less than 0.063. All of these patents are incorporated herein by this reference: U.S. Pat. No. 5,810,401; U.S. Pat. No. 5,908,212; U.S. Pat. No. 6,030,004; U.S. Pat. No. 6,467,818; U.S. Pat. No. 6.848.724; U.S. Pat. No. 7,210,710; and U.S. Pat. No. 7,416,374.

Thus, the known prior art for tool joint connections has at least three major deficiencies. The prior art lacks: (1) means for enhanced bending fatigue resistance using a large root surface that does not reduce thread shear capacity, (2) means to achieve a minimal fluid pressure loss and maximum hole cleaning capabilities through a large ID and small OD, while maintaining high torque, bending and tensile load resistance, and (3) means to avoid swelling or buckling of the box counterbore or pin nose.

The performance of a tool joint connection, as a minimum, depends upon the combination of OD, ID, material yield, pitch diameter, truncated thread height, thread angle, threads per inch, taper, one or two shoulders, clearances, and bevel diameters. These parameters are interdependent, so that it is not possible to simply change one at a time without affecting performance.

Prior art of very high torque connections teaches a long box counterbore, and long pin nose lengths are required to provide sufficient deflections to appropriately load both external and internal shoulders. But, a long box counterbore and long pin nose lengths leads to instability (swelling) of these critical sections as described by Smith (paper "Box OD Stability of Double Shouldered Tool Joints at Catastrophic Failure" presented by J. E. Smith et. al. at the March 1996 SPE/IADC Drilling Conference). Applicant has found that in addition to deflections from axial loading of box counterbore and pin nose, significant deflection occurs elsewhere in the connection. Further, applicant has found that the pin nose length should be as short as possible, because the pin nose acts as a bridge between the pin connection and the box internal shoulder for load distribution. That is, the shorter the length of the pin nose, the more compressive stresses the pin nose can take, thus making a stronger connection.

BRIEF SUMMARY OF THE INVENTION

A double-shoulder threaded tool joint connection for use in a drill stem comprises: a pin, having a pin nose diameter, and having external pin threads formed between a pin external shoulder and a pin internal shoulder, the pin having a nose section between the pin internal shoulder and the pin external threads; and a box, having a box counterbore diameter, and having internal box threads formed between a box external shoulder and a box internal shoulder. The internal box threads and the external pin threads are arranged and designed for connection with each other so that the box and the pin are connected with a common center-line and with: a primary engagement formed by the pin external shoulder forced against the box external shoulder; and a secondary engagement formed by the pin internal shoulder forced against the box internal shoulder.

The joint connection is characterized by: both the pin external threads and the box internal threads having a thread taper between 0.75 inch per foot and 1.0 inch per foot; both the pin external threads and the box internal threads having a stab flank angle and a load flank angle that are equal, and that are in a range from thirty-three to thirty-nine degrees; both the pin external threads and the box internal threads having roots formed in a shape of a portion of a circle tangent to both thread flanks with a minimum radius of 0.063 inch; the pin external threads being in the range of two to three per inch; the mating box internal threads also being in the range of two to three per inch; the box counterbore having a length of 0.750 or less; and the pin nose having a length in a range of 30% to 90% of the length of the box counterbore.

DETAILED DESCRIPTION OF THE INVENTION

Figure 1:
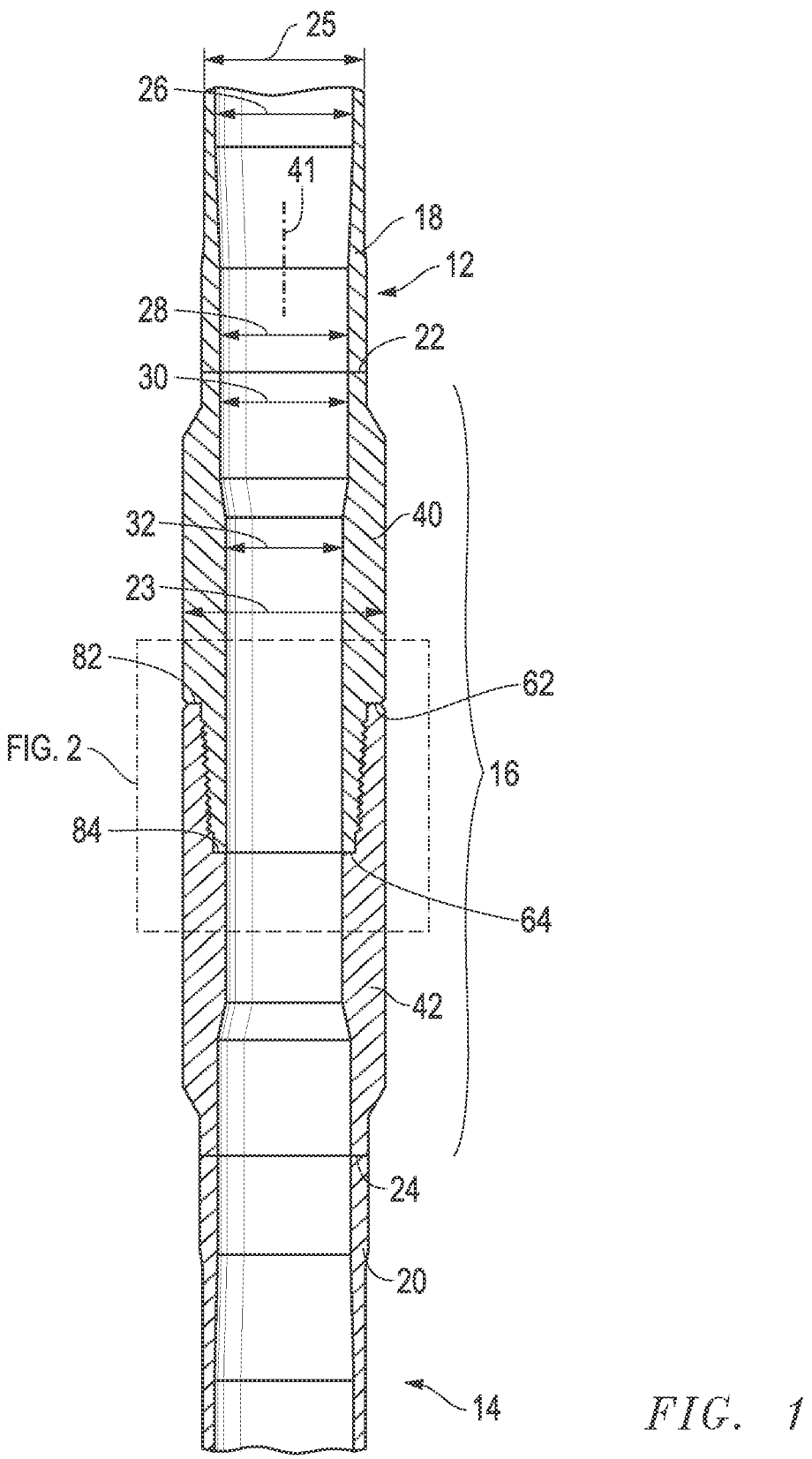
FIG. 1 is a cross-section of the two drill pipe sections joined end to end by a tool joint built according to the present invention.

In FIG. 1, an upper drill pipe 12 connects to a lower drill pipe 14 by means of a tool joint 16 according to the present invention. The drill pipes 12, 14 have upset portions 18, 20 which have thicker wall thickness for welds 22, 24 at the ends of the drill pipes 12, 14 to the ends of the tool joint 16. The tool joint 16 outer diameter 23 is larger than the outer diameter 25 of the drill pipes 12, 14. The inner diameter 26 of the drill pipes 12, 14, is larger than the inner diameter 28 of the upset portions 18, 20. The inner diameter 28 is substantially the same as the inner diameter 30 near the weld ends of the tool joint 16. In this preferred embodiment, the inner diameter 30 of the tool joint is greater than the inner diameter 32 of the section of the tool joint adjacent the threads of the pin 40 and box 42. The pin 40 and the box 42 both taper at seven-eighths of an inch per foot, and have the same centerline 41. Using a taper of less than 1 inch per foot allows the invention to have a large pin nose diameter, which in turn allows for a large contact surface area at the secondary (internal) shoulder. This results in the connection being able to withstand higher turning/twisting torques when being screwed together, and subsequently during drilling operations.

Figure 2:
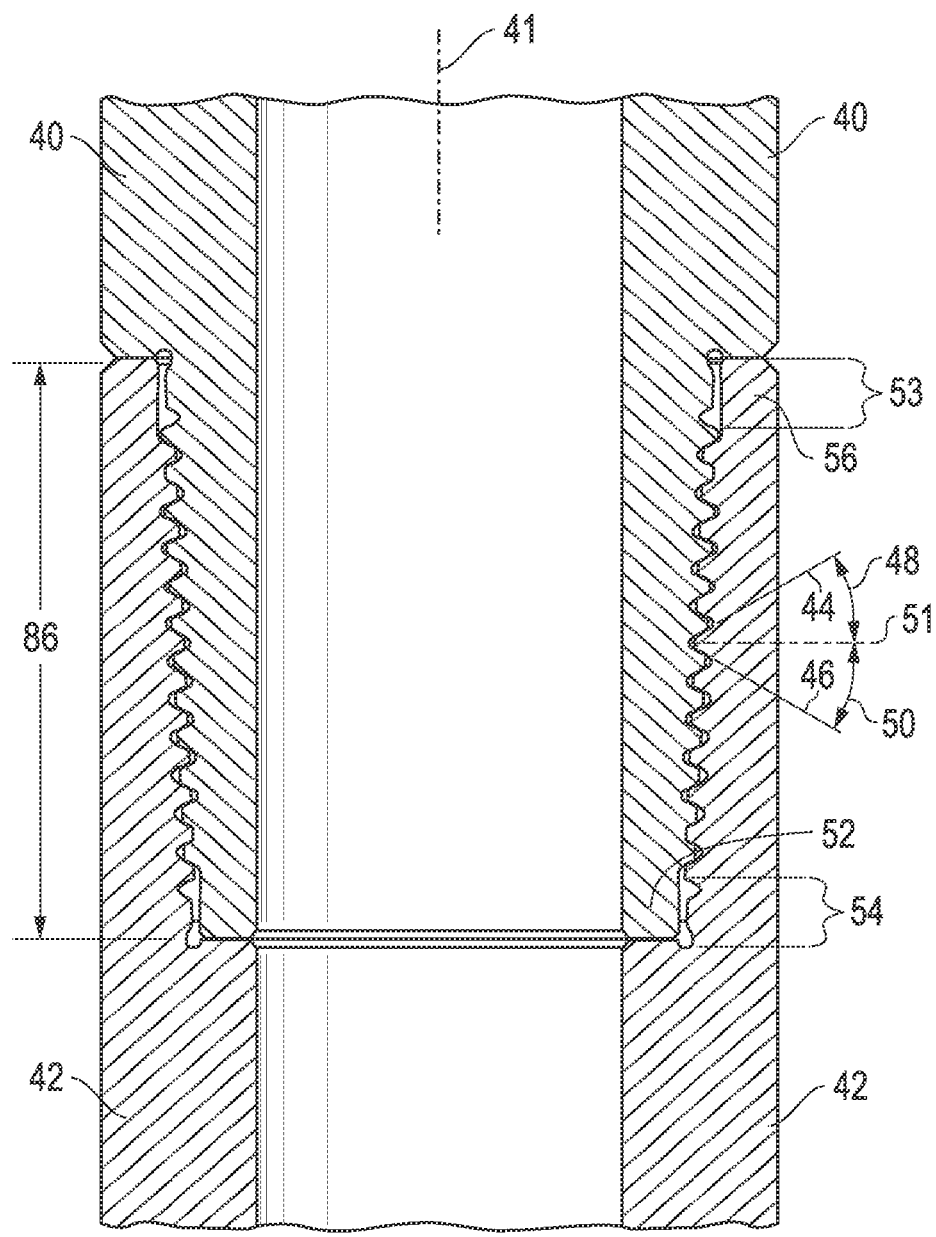
FIG. 2 is an enlarged cross-section of the tool joint of FIG. 1, showing pin and box members made-up, tapered threads, and a thread form according to the present invention.

Referring now to FIG. 2, a stab flank 44 and a load flank 46 form an angle made of two equal angles: a stab flank angle 48 of thirty-three degrees, and a load flank angle 50 of thirty-three degrees. Thus, the included thread angle is sixty-six degrees. A centerline 51 separates the angles 48, 50. A length 53 of a box counterbore 56 is less than 0.75 inch. A length 54 of a pin nose 52 is determined by using a ratio of 30% to 90% of the length 53 of the box counterbore 56. More precisely, for this preferred embodiment, the length 53 of the box counterbore 56 is 0.625, and the length 54 of the pin nose 52 is 0.375.

Figure 3:
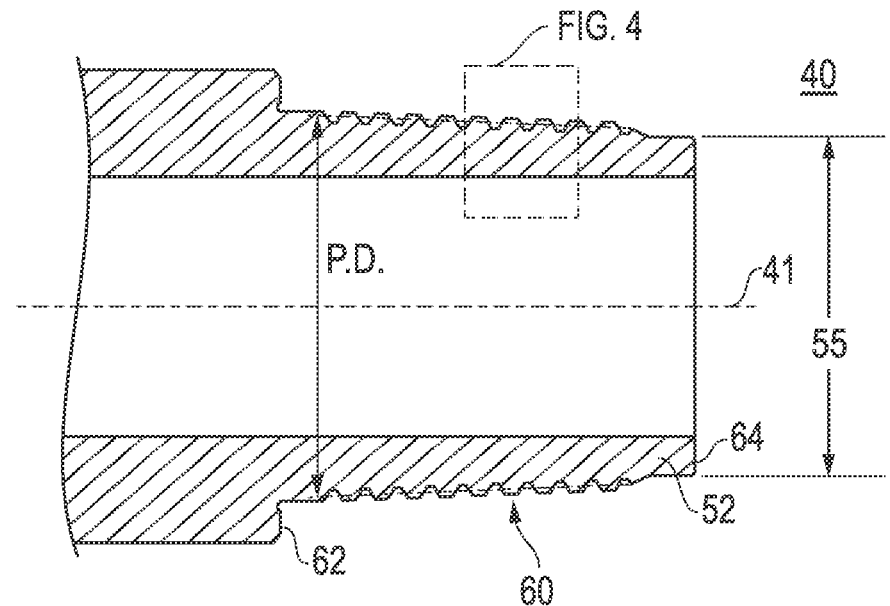
FIG. 3 is a side profile view of an axial cross-section of the pin of a threaded tool joint connection of the present invention.

Referring now to FIG. 3, the pin nose 52 has an outside diameter 55, and has a thread 60, which has a pitch of three threads per inch. The length of thread 60 provides a thread shear strength larger than the tensile strength of the pin. The pin 40 has a primary (also called external) shoulder 62. The primary shoulder 62 functions as the primary make-up surface for the tool joint 16. The pin 40 also has a secondary (also called an internal) shoulder 64. The secondary shoulder 64 offers added surface area along with a mechanical stop. The added surface area gives greater torsional strength in the connection.

Figure 4:
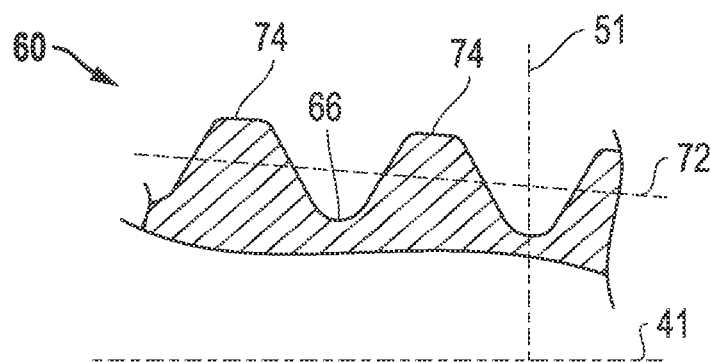
FIG. 4 is a close-up of the threads of the pin of FIG. 3.

Referring now to FIG. 4, the thread 60 of the pin 40 has a single root radius 66 tangent to both thread flanks, equal to 0.063 inch. (For larger connection sizes, a larger root radius, such as 0.070" and 0.105" is used.) The large root radius 66 allows the root of the thread 60 to withstand greater bending stresses at the tool joint's critical cross sections, thus resulting in greater resistance to metal fatigue. The large root radius 66 also allows use of higher strength material without increasing notch sensitivity, thereby providing the tool joint 16 with higher tensile load capabilities. The centerline 51 of the root radius 66 is perpendicular to the centerline 41.

The tops of the thread crests 74 of the thread 60 are aligned parallel to the pitch diameter line 72. The pitch diameter line is an imaginary line that runs the length of the thread and divides the untruncated thread in half. Radii on the thread crests 74 are used to remove any sharp corner edges of the thread form to keep the connection from galling.

Figure 5:
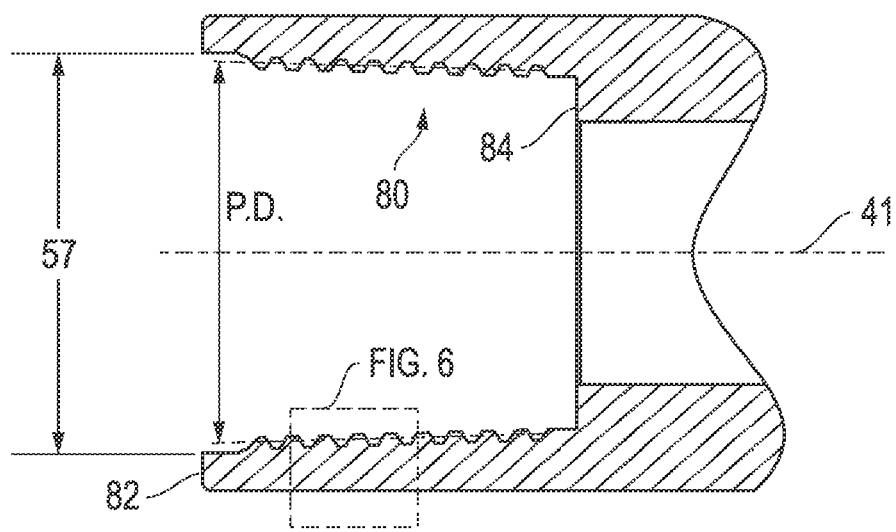
FIG. 5 is a side profile view of an axial cross-section of the box of a threaded tool joint connection of the present invention.

Referring now to FIG. 5, the box 42 has a thread 80, which has a pitch of three threads per inch. The box 42 has a primary (also called external) shoulder 82. The box 42 has an internal counterbore diameter 57.

The primary shoulder 82 functions as the primary make-up surface for the tool joint 16 and primary engagement. The box 42 also has a secondary (also called an internal) shoulder 84. The secondary shoulder 84 offers added surface area along with a mechanical stop. The added surface area gives greater torsional strength in the connection. The pin connection length 86 (shown in FIG. 2) is the distance between the external pin shoulder 62 and the internal pin shoulder 64 (the pin connection length 86 is also shown in FIG. 3), which, after makeup, is the same as the box connection length, defined as the distance between the external box shoulder 82 and the internal box shoulder 84. Prior to makeup, the pin connection length is very slightly shorter than the box connection length. Thus, during makeup, the primary (external) shoulder 82 engages just before the secondary (internal) shoulder. The ratio of the connection length 86 to the difference of inside diameter of the counterbore 53 and the outside diameter of the pin nose 52 is in a range of 5 to 6.5. With this ratio, the pin 40 is easily stabbed into the box 42, despite diametral or angular misalignment of the pin centerline 41 and the box centerline 41.

Figure 6:
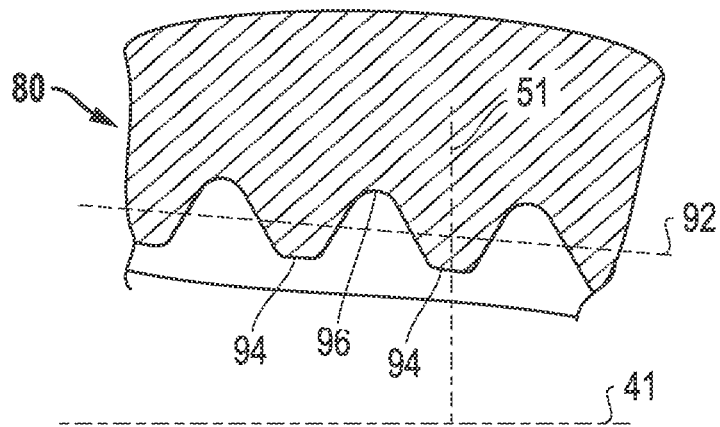
FIG. 6 is a close-up of the threads of the box of FIG. 5.

Referring now to FIG. 6, the thread 80 of the box 42 has a single box root radius 96, tangent to both thread flanks, equal to 0.063 inch. (For larger connection sizes, a larger root radius, such as 0.070" and 0.105" is used.) The centerline 51 of the box root radius 96 is perpendicular to the centerline 41. This box thread form provides the same benefits as described for the pin.

The tops of the thread crests 94 of the thread 80 are aligned parallel to the pitch diameter line 92. The pitch diameter line is an imaginary line that runs the length of the thread and divides the un-truncated thread in half. Radii on the thread crests 94 are used to remove any sharp corner edges of the thread form to keep the connection from galling.

Referring again to FIG. 1, the pin 40 and the box 42 connect with a primary engagement formed by the pin external shoulder 62 forced against the box external shoulder 82, and a secondary internal engagement formed by the pin internal shoulder 64 forced against the box internal shoulder 84. Referring to FIG. 3 and FIG. 4, the pitch diameter, P.D., measured at 0.0625 from either the external shoulder 62 for the pin or external shoulder 82 for the box, is the substantially the same for both pin 40 and box 42.

The present invention incorporates a novel thread design for assembly of a drill stem used in drilling. A threaded tool joint connection for use in a drill stem assembly comprises: (a) a pin with external threads which are machined between a pin external shoulder and a pin internal shoulder; (b) a box with internal threads which are machined between a box external shoulder and a box internal shoulder; (c) shallow tapered threads in a range of 0.75 to 1.0 inches per foot, which provide for high torque, high cyclic fatigue, and axial tensile load resistance; (d) a thread form design to lower stress concentration that has a large root surface, 0.063 inch or larger, that is a result of a single radius, tangent to the load and stab flanks; (e) a range of thread included angles from 66 to 78 degrees that facilitate a large root radius while not imparting large hoop stresses: (f) a range of threads per inch from two to three that provides rapid make-up without creating a danger of the connection un-expectantly unscrewing during operations; and (g) a short box counterbore less than 0.75 inch, and a short pin nose 30% to 90% of the counterbore length, which together provides resistance to buckling under large loads.

The unique combination of the features of the invention provide unexpected torsional efficiency so as to enable a slim hole profile (large tool joint ID and small OD) without sacrificing torsional strength, tensile capacity, connection shear strength, and connection bending strength. In another feature of the connection, the torque to breakout (unscrew) the connection is maintained at 65% or more of the make-up torque. In yet another feature of the invention, the ratio of connection overall length to the difference between counterbore and nose diameters is in a range of 5 to 6.5, which allows the pin to be stabbed into the box at an angle similar to conventional API connections, despite the invention's shallow taper.

The invention's range of tapers balances the benefit that zero or shallow taper provides in strength at the internal shoulder versus the benefit that increased taper provides in robustness of stabbing a pin into a box, and starting thread engagement. The invention's range of threads per inch balances the turns to make up the connection (more rapid make-up with fewer threads per inch) with reduced break out torque arising from a larger thread helix angle. The invention's range of thread angle balances the increased torque gained with a larger angle with the detrimental effect of larger hoop stresses arising from a larger angle. Both fewer threads per inch and a larger thread angle allow a larger thread root radius. However, these also effect thread height and thread engagement Larger thread height reduces cross sectional area and associated strength. A minimum thread engagement is required to avoid thread jump out, which is exasperated with higher hoop stress.

The invention's 0.063 minimum thread root radius greatly reduces thread stress concentration. In this manner, fatigue strength and resistance to stress corrosion cracking is dramatically enhanced. The low stress concentration allows use of higher strength material without detrimental effects arising from notch sensitivity.

Having thread roots formed according to the invention of a portion of a circle tangent to thread flanks provides the benefit of consistent control of the geometry during manufacturing, and during subsequent inspections. Connections with more complex thread root geometry lose most or all of their ability to reduce stress concentration if not precisely formed. Because drill pipe connections must be repaired several times during the life of the pipe, the connections are frequently machined in small, local machine shops in remote areas of the world. Simplicity of machining, and quality control, are essential in reliably providing actual connection performance. Additionally, the invention's simple thread root geometry facilitates fatigue resistance enhancements by application of compressive residual stresses in the thread root by processes such as thread cold rolling. (The cold rolling process for oilfield threads is explained in the U.K. patent, GB2408472).

The present invention has a box counterbore length of 0.75 inch or less and pin nose length which is 30% to 90% of the box counterbore length. With these short lengths, these sections can withstand more compressive stresses which arise from large make-up and applied torque.

The ratio of break out torque to make up torque decreases with a larger thread helix angle. The helix angle increases with fewer thread per inch for a given pitch diameter or a smaller diameter for the same threads per inch. The present invention maintains a minimum ratio of 65% by controlling helix angle. With the high torque capability of the invention and control of the ratio, sufficient break out is provided to prevent the tool joint connection from unscrewing while in operation.

The present invention causes the thread shear strength to be greater than the tensile strength. Thread shear strength arises from both the invention's thread form, which does not undercut the threads' flanks, and from maintaining an adequate length of engaged threads.

What is claimed is:
1. A double shoulder threaded tool joint connection for use in a drill stem comprising:
   a pin, having a pin nose diameter, and having external pin threads formed between a pin external shoulder and a pin internal shoulder, the pin having a nose section between the pin internal shoulder and the pin external threads; and a box, having a box counterbore diameter, and having internal box threads formed between a box external shoulder and a box internal shoulder;

wherein the internal box threads and the external pin threads are arranged and designed for connection with each other so that the box and the pin are connected with a common center-line and with:

a primary engagement formed by the pin external shoulder forced against the box external shoulder; and a secondary engagement formed by the pin internal shoulder forced against the box internal shoulder, and wherein the joint connection is characterized by:

both the pin external threads and the box internal threads having a thread taper between 0.75 inch per foot and 1.0 inch per foot;

both the pin external threads and the box internal threads having a stab flank angle and a load flank angle that are equal, and that are in a range from thirty-three to thirty-nine degrees;

both the pin external threads and the box internal threads having roots formed in a shape of a portion of a circle tangent to both thread flanks with a minimum radius of 0.063 inch;

the pin external threads being in the range of two to three per inch;

the box internal threads being in the range of two to three per inch;

the box counterbore having a length of 0.750 or less; and the pin nose having a length in a range of 30% to 90% of the length of the box counterbore.

2. The connection of claim 1, wherein the torque required to unscrew the connection is at least 65% of the torque used to tighten the connection.

3. The connection of claim 2, wherein the ratio of the overall length of the connection to the difference between the box counterbore diameter and the pin nose diameter is in a range of 5 to 6.5.

4. The connection of claim 1, wherein both the pin external threads and the box internal threads have a stab flank angle and a load flank angle that are equal to thirty-three degrees.

5. The connection of claim 4, wherein both the pin external threads and the box internal threads have a thread taper equal to 0.875 inch per foot; and wherein both the pin external threads and the box internal threads are three per inch.

6. The connection of claim 4, wherein both the pin external threads and the box internal threads have a thread taper equal to one inch per foot; wherein both the pin external threads and the box internal threads are 2.75 per inch.

7. The connection of claim 4, wherein both the pin external threads and the box internal threads have a thread taper equal to 0.75 inch per foot; and wherein both the pin external threads and the box internal threads are 2.75 per inch.

8. A method of using a double-shoulder threaded connection for connecting tool joints in a drill stem, wherein the connection comprises:

a pin, having a pin nose diameter, and having external pin threads formed between a pin external shoulder and a pin internal shoulder, the pin having a nose section between the pin internal shoulder and the pin external threads; and a box, having a box counterbore diameter, and having internal box threads formed between a box external shoulder and a box internal shoulder;

wherein the internal box threads and the external pin threads are arranged and designed for connection with each other so that the box and the pin are connected with a common center-line and with:

a primary engagement formed by the pin external shoulder forced against the box external shoulder; and a secondary engagement formed by the pin internal shoulder forced against the box internal shoulder, and wherein the joint connection is characterized by:

both the pin external threads and the box internal threads having a thread taper between 0.75 inch per foot and 1.0 inch per foot;

both the pin external threads and the box internal threads having a stab flank angle and a load flank angle that are equal, and that are in a range from thirty-three to thirty-nine degrees;

both the pin external threads and the box internal threads having roots formed in a shape of a portion of a circle tangent to both thread flanks with a minimum radius of 0.063 inch;

the pin external threads being in the range of two to three per inch;

the box internal threads being in the range of two to three per inch;

the box counterbore having a length of 0.750 or less; and the pin nose having a length in a range of 30% to 90% of the length of the box counterbore;

the method comprising: the step of threading the pin threads with the box threads to form the double-shoulder threaded tool joint.

9. The method of claim 8, wherein the torque required to unscrew the connection is at least 65% of the torque used to tighten the connection.

10. The method of claim 9, wherein the ratio of the overall length of the connection to the difference between the box counterbore diameter and the pin nose diameter is in a range of 5 to 6.5.

11. The method of claim 8, wherein both the pin external threads and the box internal threads have a stab flank angle and a load flank angle that are equal to thirty-three degrees.

12. The method of claim 11, wherein both the pin external threads and the box internal threads have a thread taper equal to 0.875 inch per foot; and wherein both the pin external threads and the box internal threads are three per inch.

13. The method of claim 11, wherein both the pin external threads and the box internal threads have a thread taper equal to one inch per foot; wherein both the pin external threads and the box internal threads are 2.75 per inch.

14. The method of claim 11, wherein both the pin external threads and the box internal threads have a thread taper equal to 0.75 inch per foot; and wherein both the pin external threads and the box internal threads are 2.75 per inch.

* * * * *